March 25, 1924.

A. H. KLINE

SPRAYER

Filed Jan. 22, 1923

1,488,125

Inventor
Alvin H. Kline
By J. M. St. John
Atty.

Patented Mar. 25, 1924.

1,488,125

UNITED STATES PATENT OFFICE.

ALVIN H. KLINE, OF CEDAR RAPIDS, IOWA.

SPRAYER.

Application filed January 22, 1923. Serial No. 614,090.

*To all whom it may concern:*

Be it known that I, ALVIN H. KLINE, a citizen of the United States, residing at Cedar Rapids, in the county of Linn and State of Iowa, have invented certain new and useful Improvements in Sprayers; and I do hereby declare the following to be a full, clear, and exact description of the invention, such as will enable others skilled in the art to which it appertains to make and use the same.

This invention relates to spraying apparatus such as is used for spreading paint, treating plants with poisonous liquids, and the like, and the object of the invention is to provide apparatus for this purpose that will keep the liquid mixture well stirred, and prevent the settling of the heavier ingredients to the bottom, and will also give the operator complete control of the spraying operation, so that the material may be delivered uniformly and continuously, and in such quantities as the nature of the case demands.

The invention is fully disclosed in the description and claims following, reference being had to the accompanying drawing, in which:—

Figure 1:
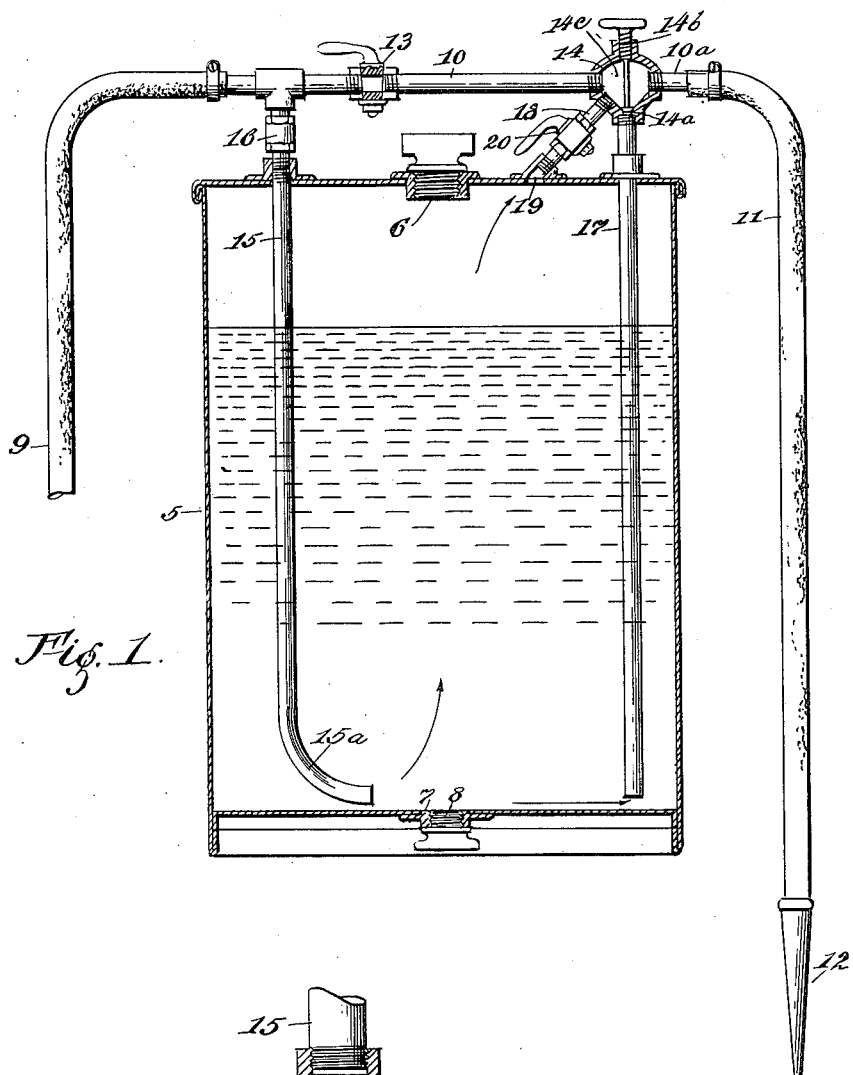
Figure 2:
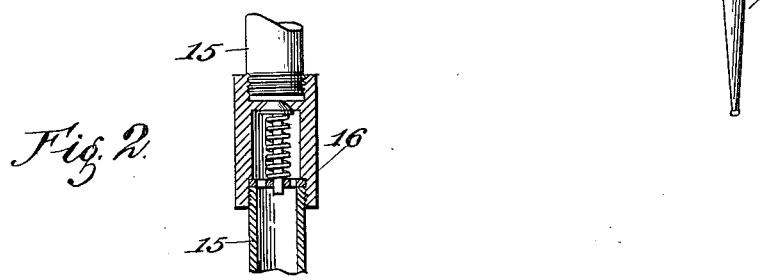

Figure 1 is a side elevation of my improved apparatus, partly in section, the liquid receiver being also in section. Fig. 2 is a sectional view of a simple check-valve used as a part of the controlling mechanism.

In the drawing the numeral 5 denotes an air-tight receptacle for a liquid mixture, provided with a suitable filling nozzle and plug 6, and a draining outlet 7 provided with a tight fitting screw-plug 8.

Connecting with a source of compressed air, not shown, is a hose 9 attached to the main air-pipe 10. To its terminal $10^a$ connects the delivery hose 11, provided with a suitable spray nozzle 12. The direct air-pipe aforesaid is provided with a suitable air-cock 13 to regulate the direct flow of air from the supply hose to the discharge hose. The air-pipe is also provided with a special three-way valve 14, which will be described presently.

From a T between the air-cock and the supply hose a pipe 15 depends to near the bottom of the liquid in the receptacle, and preferably bends at $15^a$ so as to discharge air into the liquid horizontally, partly for the purpose of agitating it to prevent settling, and partly to force liquid through the discharge hose, as will be explained hereafter. This pipe is provided with a simple, spring-closed check-valve 16, to prevent the possibility of any material being forced back through it by any excess of air under pressure beyond its outlet.

Between the air-cock described, and the discharge hose, is placed the special valve 14. This has opposite openings for the main pipe, and a valved opening $14^a$ for a depending pipe 17, which extends to near the bottom of the receptacle. A diagonal pipe 18 enters the valve by another opening, and communicates with the upper portion of the receptacle by a hole 19. This pipe is fitted with an air-cock 20, by means of which the outward flow of air from the upper part of the receptacle may be accurately controlled. The valve 14 is closed, or opened to service requirements, by a suitable stem $14^b$. A large, domed cavity $14^c$ is provided in this valve, so that there is room for the creation of a whirl or vortex therein, as air enters it from two converging directions, and liquid from another. The purpose of this is to thoroughly commingle the air and liquid, even before it enters the discharge hose, and thus insure a proper mixture as sprayed from the outlet nozzle.

The construction is such as to enable the operator to secure any desired result in the manipulation of the apparatus. With the air-cock 13 wide open, and the valve 14 opened more or less, the effect is that of the familiar atomizer. This, however, is not satisfactory under all conditions, as for example, in spreading paint, or anything else tending to choke the discharge at the nozzle, when the liquid material will cease to flow properly. The operator may then partially close this cock, whereupon a part of the air is diverted to the down-pipe 15, and with the cock 20 closed liquid is positively forced up through the pipe 17 in such volume as may be required. In actual practice all of the valves will be opened more or less. A part of the air then flows through the pipe 15, and maintains an agitation in the liquid to keep it well mixed. Its force also helps the up-flow of liquid through the pipe 17. With the cock 20 open a little air passes out of the upper part of the receiver, and so assists in the agitation of the liquid, as well as the creation of a whirl in the domed valve.

The device is thus adapted for use with any sort of liquid mixture, serves to maintain a uniform density therein, and permits a discharge thereof in any kind of a spray that may be desired.

Having thus described my invention, I claim:

1. In a sprayer, a closed receptacle for liquid, a main air-pipe communicating with a source of compressed air, a cock therein, a pipe depending into the liquid from the main pipe back of the cock, a liquid supply pipe extending from near the bottom of the receptacle to the main pipe forward of said cock, a valve therefor, and a diagonal pipe provided with a regulating cock extending from near the outlet of said supply-pipe to an outlet in the upper part of the receptacle.

2. In a sprayer, a closed receptacle for liquid, a main air-pipe communicating with a source of compressed air, a cock therein, a pipe depending into the liquid from the main pipe back of the cock, a domed valve in the main air-pipe forward of the cock, a liquid supply pipe depending therefrom to near the bottom of the receptacle, and a diagonal pipe connecting said domed valve with the upper part of the receptacle, and provided with a regulating valve.

3. In a sprayer, a closed receptacle for liquid, a main air pipe communicating with a source of compressed air, a cock therein, a pipe depending into the liquid from the main pipe, a check-valve in the air line to the liquid, a liquid supply pipe extending from near the bottom of the receptacle to the main pipe forward of said cock, a valve therefor, and a diagonal pipe, provided with a regulating cock, extending from near the outlet of the supply pipe to an outlet in the upper part of the receptacle.

In testimony whereof I affix my signature in presence of two witnesses.

ALVIN H. KLINE.

Witnesses:
JNO. B. FINNEY,
MARTHA A. HEALD.